United States Patent
Szelag et al.

(10) Patent No.: US 10,197,689 B1
(45) Date of Patent: Feb. 5, 2019

(54) PHYSICALLY DAMPED NOISE CANCELING HYDROPHONE

(71) Applicants: Jeffrey A Szelag, Westport, MA (US); Michael R Zarnetske, Bristol, RI (US)

(72) Inventors: Jeffrey A Szelag, Westport, MA (US); Michael R Zarnetske, Bristol, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 480 days.

(21) Appl. No.: 15/191,836

(22) Filed: Jun. 24, 2016

(51) Int. Cl.
   *B06B 1/00* (2006.01)
   *G01V 1/16* (2006.01)
   *B06B 1/06* (2006.01)

(52) U.S. Cl.
   CPC .............. *G01V 1/162* (2013.01); *B06B 1/06* (2013.01)

(58) Field of Classification Search
   USPC ......................................................... 367/157
   See application file for complete search history.

(56) References Cited

U.S. PATENT DOCUMENTS

| | | | |
|---|---|---|---|
| 4,809,244 A | 2/1989 | Penneck et al. | |
| 4,841,494 A | 6/1989 | Banno | |
| 5,267,223 A * | 11/1993 | Flanagan | H04R 1/44 310/337 |
| 5,515,342 A | 5/1996 | Stearn et al. | |
| 5,521,885 A * | 5/1996 | Harvey | G01V 1/201 174/101.5 |
| 5,702,629 A * | 12/1997 | Cui | H01L 41/37 252/62.9 R |
| 5,796,676 A | 8/1998 | Chang et al. | |
| 6,002,649 A * | 12/1999 | Janus | H04R 17/00 367/160 |
| 6,370,084 B1 | 4/2002 | Cray | |
| 7,719,926 B2 * | 5/2010 | Brogan | H04R 17/00 310/337 |
| 7,889,601 B2 | 2/2011 | Goodmote | |
| 8,600,592 B2 | 12/2013 | Heard et al. | |
| 8,717,849 B1 | 5/2014 | Zarnetske et al. | |
| 8,854,923 B1 * | 10/2014 | Eyster | H04R 17/00 310/317 |
| 9,057,796 B2 | 6/2015 | Nyffenegger et al. | |
| 9,772,220 B1 * | 9/2017 | Cook | G01V 1/186 |
| 9,874,298 B2 * | 1/2018 | Peters | F16L 11/08 |
| 2009/0230969 A1 * | 9/2009 | Hall | G01V 11/002 324/343 |
| 2009/0245027 A1 * | 10/2009 | Brogan | H04R 17/00 367/155 |
| 2011/0305116 A1 * | 12/2011 | Lagakos | G01H 9/004 367/149 |

(Continued)

*Primary Examiner* — James R Hulka
(74) *Attorney, Agent, or Firm* — James M. Kasischke; Michael P. Stanley

(57) ABSTRACT

A hydrophone is provided which includes at least four piezoelectric sensors mounted to a central section of syntactic acoustic dampening material as well as a layer of corprene between the piezoelectric sensors and the central section. Each of the piezoelectric sensors includes radially poled piezoelectric cylinders wired in series with inert polycarbonate endcaps and an isolator layer. The piezoelectric cylinders are assembled co-axially. The piezoelectric cylinders are then adhered to the central section and sandwich a layer of corprene. The corprene also adds noise dampening properties.

2 Claims, 4 Drawing Sheets

(56) References Cited

U.S. PATENT DOCUMENTS

| | | | |
|---|---|---|---|
| 2012/0174676 A1* | 7/2012 | Nyffenegger | G01V 1/186 |
| | | | 73/647 |
| 2013/0279920 A1* | 10/2013 | Herzog | G02B 6/36 |
| | | | 398/212 |
| 2014/0154991 A1 | 6/2014 | Brown | |
| 2014/0312350 A1 | 10/2014 | Schneider et al. | |
| 2016/0211924 A1* | 7/2016 | Deng | H04B 11/00 |
| 2016/0369919 A1* | 12/2016 | Peters | F16L 11/086 |
| 2017/0232277 A1* | 8/2017 | Hall | A61N 7/02 |
| | | | 601/2 |

\* cited by examiner

PHYSICALLY DAMPED NOISE CANCELING HYDROPHONE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to a hydrophone that dampens structure-borne noise emanating from a platform on which the hydrophone is mounted.

(2) Description of the Prior Art

An acoustic hydrophone can transfer underwater pressure waves to electrical energy. As a result, an output charge can be monitored from piezoelectric material with the operation similar to an underwater microphone. Typically, hydrophones are used as omni-directional sensors or are used as directional sensors in an array format. The array is mounted to a structure which acts a foundation.

Periodically, the structure that the hydrophone is mounted to also maintains machinery. The machinery can generate a considerable amount of noise which affects the performance of the hydrophone; often interfering with the ability of the hydrophone to detect frequencies in the range of the generated noise.

In the prior art, the design of a noise cancelling hydrophone was originally developed by Kahn (U.S. Pat. No. 4,928,264). In the reference, noise cancelling hydrophones were described, including the piezoelectric stack that includes two types of piezoelectric transducers coupled together. One transducer maintains voids and is sensitive to hydrostatic acoustic signals. The other transducer does not have voids and is relatively insensitive to hydrostatic signals. Both types of transducers are equally sensitive to mount-transmitted ship noise. The two noise-related electrical output signals are combined to cancel each other out; so that the net signal represents the signal received by the transducers through the water.

In Stearns et al. (U.S. Pat. No. 5,515,342) a thin corprene release material is provided behind low and high frequency head masses to provide isolation from the water proofing material and internal fill material, and to avoid inhibition of longitudinal motion. One may use either a layer of polyurethane cast over the unit or a vulcanized Neoprene layer as illustrated to waterproof the unit. The low frequency ceramic stack, tail mass and stress rod are then added to the head mass assembly and installed into the casing to complete a dual frequency unit.

Chang et al. (U.S. Pat. No. 5,796,676) discloses a method of making a hydrophone cap for a cable assembly that includes the steps of: forming a block having a cylindrical surface and a cavity, which is disposed in a receiving surface of the block; mounting a hydrophone, to which lead wires attach, in the baffle material; thereby, creating a hydrophone assembly. The hydrophone assembly is installed in a cavity; passing the lead wires out of the cavity; sealing the cavity around the lead wires; and mounting the cover over the cavity. This assembly minimizes noise by minimizing uneven surfaces which disrupt laminar flow around the cable assembly.

Cray (U.S. Pat. No. 6,370,084) discloses an acoustic vector sensor. An accelerometer of the acoustic vector sensor is encased in a sphere of syntactic foam and the sphere of is surrounded by a spherical body, which in turn, is contained in a rigid protective shield and a body of a resilient viscoelastic rubber; thereby, providing an acoustic vector sensor with improved sensitivity in an environment of rigid structures, improved insulation from noise produced by such structures, and is further adapted to free float in a body of water.

Goodmote et al. (U.S. Pat. No. 7,889,601) discloses a transducer suitable for use with a tail mass in which the transducer receives electrical connections through a bottom plug composed of Corprene or other suitable isolation material. The transducer also includes a head mass that is exposed to acoustic waves to be sensed, a bulk driver, or a stack of ring shaped drivers, such as one or more piezoelectric ceramic elements, and the driver wrap, which may be composed of Corprene or other similar material, acoustically isolates the driver and washer electrically insulates the headmass from the electrode also wrap may be composed of Corprene or other similar material. The acoustically absorbent substrate may be made from a variety of materials; one example being SADM to isolate the transducers from noise generated by the vessel on which they are installed.

Heard et al. (U.S. Pat. No. 8,600,592) discloses an acoustic receiver that generates a set of one or more receiver signals indicative of the local acoustic field in the vicinity of the receiver. The acoustic receiver comprises a plurality of acoustic transducers (such as, for example, acoustic hydrophones) arranged such that the receiver signals contain information that can be used to calculate a direction from which an acoustic signal was received.

Zarnetske et al. (U.S. Pat. No. 8,717,849) discloses an acoustic transducer with an electromechanical driver comprising a plurality of single crystal piezoelectric elements joined to an inner surface and arranged to form an electromechanical stack assembly. Each single crystal piezoelectric element has a surface, an opposite surface, and a pair of sidewalls that include electrodes of each single crystal piezoelectric element and is adhesively bonded to an inner surface. In one embodiment, a two-component epoxy structural adhesive is used to bond the single crystal piezoelectric elements to the inner surface.

Nyffenegger et al. (U.S. Pat. No. 9,057,796) discloses a sensor system comprising an opaque hermetic sealant, such as a durable silicone rubber, applied over the sensing device. In addition to making the system resistant to water intrusion; the sealant may be designed to assist in stabilizing the spiral configuration of the piezo polymer coaxial cable which forms the sensing device, and the sensor system with both the sealant and the piezo polymer coaxial cable removed; thereby, exposing the frame—shown as a transparent member.

As such, there is a continuing need for a hydrophone that has the ability to dampen structure-borne noise emanating from a platform on which the hydrophone is mounted.

SUMMARY OF THE INVENTION

It is therefore a primary object and general purpose of the present invention to provide a hydrophone that has the ability to dampen structure-borne noise emanating from a platform on which the hydrophone is mounted.

In order to attain the object of the invention, the hydrophone described herein comprises an array of vertically stacked radially-poled ceramic rings that are mounted in a circular fashion to provide a receive sensitivity. The piezoelectric sensors are mounted to a central section comprising syntactic acoustic dampening material (or SADM) as well as a layer of corprene between the piezoelectric sensors and the SADM central section.

The piezoelectric sensors are arranged at ninety degree offsets that also offer additional noise dampening qualities such that sensors that are one hundred and eighty degrees or opposite to each other. The positioning of the sensors provides a time delay where signals can be added to provide a significant backside null; thereby, cancelling received signals (noise or otherwise) in the opposite direction as the intended direction.

The piezoelectric sensors of the hydrophone measure approximately one inch in height and are arranged on an approximate three inch diameter. Total mass is less than two pounds for the piezoelectric sensors and the central SADM section.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DETAILED DESCRIPTION OF THE INVENTION

Figure 1:
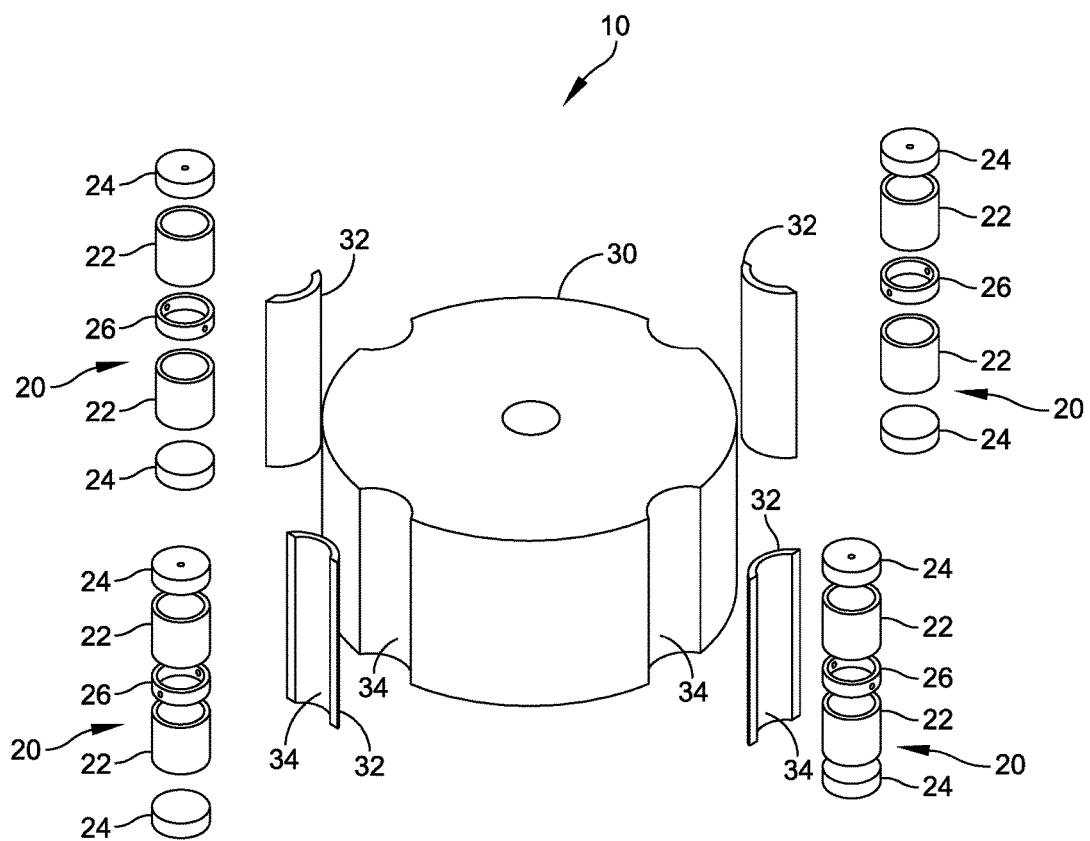
FIG. 1 depicts an expanded view of piezoelectric sensors and syntactic acoustic dampening material of the present invention.

In the figures, FIG. 1 depicts a hydrophone 10 of the present invention. The hydrophone 10 includes cylindrical piezoelectric sensors 20 and a core of syntactic acoustic dampening material (SADM) 30. Each of the sensors 20 includes radially poled piezoelectric cylinders 22 wired in series, with inert polycarbonate endcaps 24 and an isolator layer 26. The piezoelectric cylinders 22 are assembled co-axially.

The piezoelectric cylinders 22 are then adhered to the SADM 30 and sandwich a 3/32 inch thick layer of corprene 32 (a cork and rubber mixture). The corprene 32 also adds noise dampening properties.

The layering of the SADM 30, the corprene 32 and the sensors 20 can also include contact adhesive 34. The contact adhesive 34 should be pliable when cured.

Figure 2:
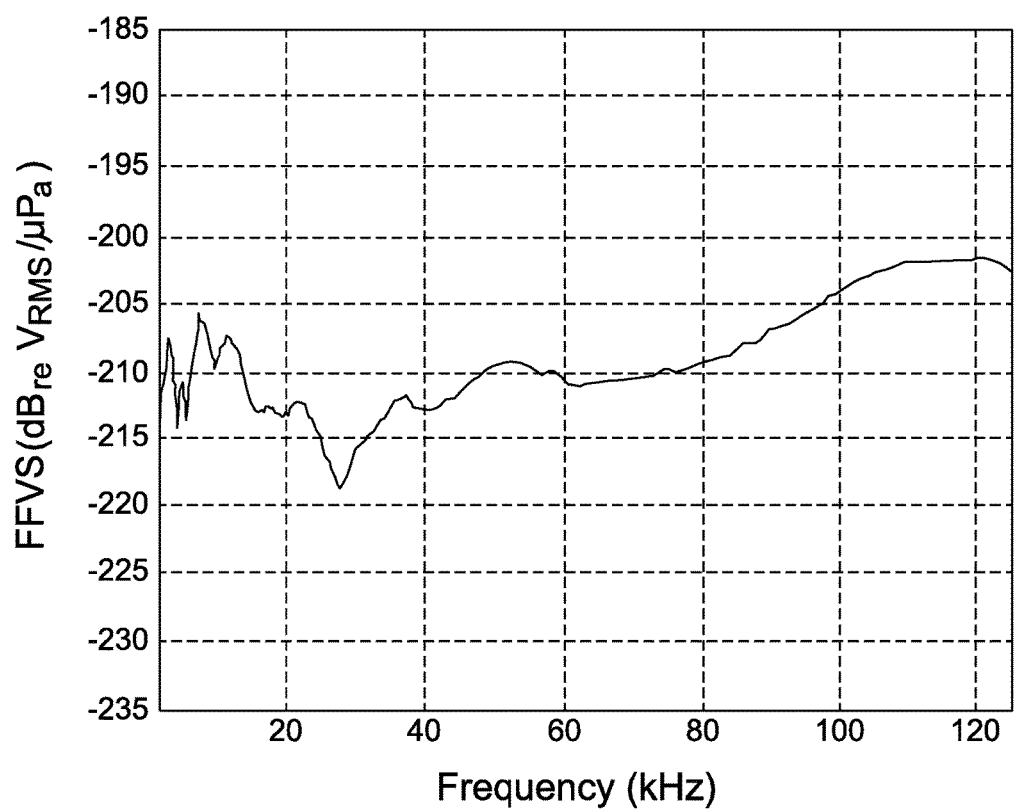
FIG. 2 is a graph depicting nominal free range voltage sensitivity across a frequency range in which the voltage sensitivity defines how much electrical output would be provided by certain incoming pressure waves.
Figure 3:
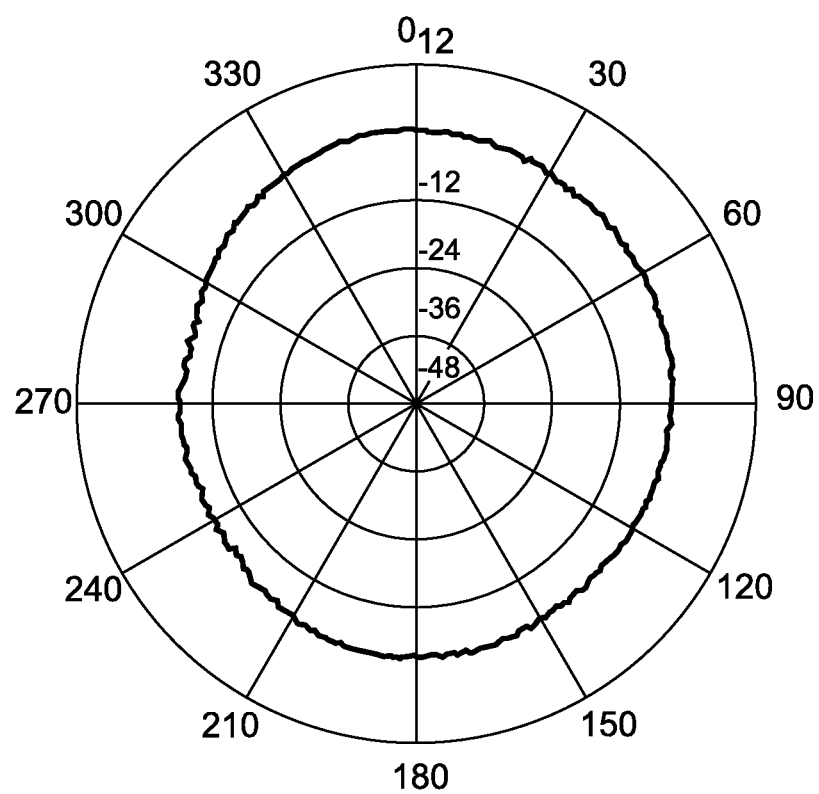
FIG. 3 depicts a single channel directivity pattern at a single frequency.
Figure 4:
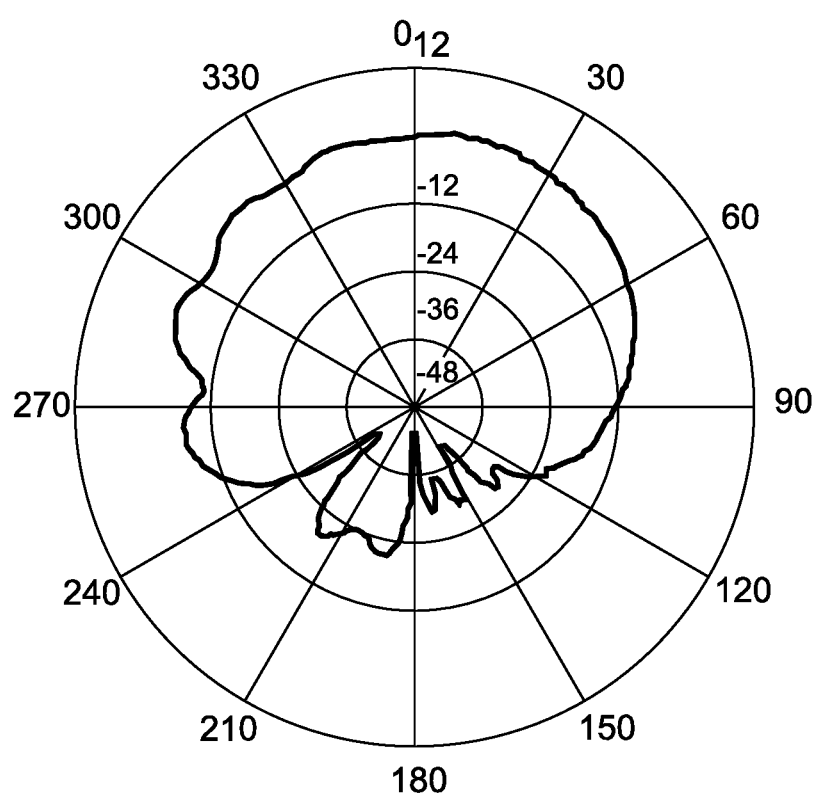
FIG. 4 depicts a single channel directivity pattern at another frequency and shows the backside noise cancelling capability of the design.

FIG. 2 depicts nominal free field voltage sensitivity across a very wide frequency range. FIG. 3 and FIG. 4 each depict measured single channel directivity at a different frequency. As expected, the directivity increases with reducing beamwidth and frequency.

Due to the arrangement of the sensors 20 at ninety degree separations around an approximately 2.75 inch diameter; sensors with one hundred and eighty degree separation can be used in conjunction to cancel additional acoustic noise when there is a need to focus the sensitivity into one hemisphere. This is accomplished by adding the received time series signals of the one hundred and eighty degree (ie: opposite) sensors but with a slight time delay that would account for the separation distance between the sensors, x, and the approximate sound speed of SADM ($C_{SADM}$ or $X/C_{SADM}$.

The resulting receive pattern is defined by Equation (1):

$$M_e=(1+\cos \theta)/2, \qquad (1)$$

where $M_e$ is the voltage sensitivity as a function of angle and θ defines the angle off the maximum response axis.

This adds 4.8 dB to the receiver sensitivity and backside noise cancelling capabilities due to the increased directivity. Likewise, using all four sensors would increase the directivity to further add 8.8 dB to the receive sensitivity by weighting the sensor inputs as defined in Equation (2)

$$Me=(1+2 \cos \theta+\cos 2\theta)/4 \qquad (2)$$

The submitted design uses radially-poled piezoelectric cylinders with inert polycarbonate endcaps to provide the stated capabilities in a much smaller form factor (3-inch diameter). Prior art hydrophones use piezoelectric elements that operate in a different mode by using tonpilz elements that operate axially with a head mass, a tall mass and an active piezoelectric element in between and are arranged in a planar array.

Furthermore, advantages of the hydrophone 10 of the present invention are simplicity, easily attainable materials and uncomplicated shapes that require minimal machining. Commercial hydrophones were considered; however, none would provide the adequate sensitivity and noise cancelling capabilities of the hydrophone 10 of the present invention.

The foregoing description of the preferred embodiments of the invention has been presented for purposes of illustration and description only. It is not intended to be exhaustive or to limit the invention to the precise form disclosed; and obviously many modifications and variations are possible in light of the above teaching.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:
1. A hydrophone comprising:
   a cylindrical core with two end planes and at least four indents spaced ninety degrees apart between each said end plane with said core being syntactic acoustic dampening material;
   a layer of corprene adhered to each of said indents; and
   at least four cylindrical piezoelectric sensors; each of said sensors sized to position within each of said indents;
   wherein each said layer of corprene is affixed therebetween each of said sensors and said core.
2. The hydrophone in accordance with claim 1 wherein each of said sensors are assembled co-axially with radially poled piezoelectric cylinders wired in series, polycarbonate endcaps and an isolator layer.

* * * * *